(12) United States Patent
Heren et al.

(10) Patent No.: US 7,398,954 B2
(45) Date of Patent: Jul. 15, 2008

(54) REMOTE-COUPLED FAUCET ADAPTER

(75) Inventors: Lawrence P. Heren, East Peoria, IL (US); Michael Breedlove, Hanna City, IL (US); Timothy R. Casica, Metamora, IL (US)

(73) Assignee: L. R. Nelson Corporation, Peoria, IL (US)

( * ) Notice: Subject to any disclaimer, the term of this patent is extended or adjusted under 35 U.S.C. 154(b) by 184 days.

(21) Appl. No.: 11/127,695

(22) Filed: May 12, 2005

(65) Prior Publication Data

US 2006/0017037 A1 Jan. 26, 2006

Related U.S. Application Data

(60) Provisional application No. 60/570,957, filed on May 13, 2004.

(51) Int. Cl.
*F16K 51/00* (2006.01)
*F16L 29/00* (2006.01)

(52) U.S. Cl. .................. 251/148; 251/331; 137/883; 137/613

(58) Field of Classification Search ............... 251/148, 251/331; 137/613, 615, 883; 285/38
See application file for complete search history.

(56) References Cited

U.S. PATENT DOCUMENTS

| | | | | |
|---|---|---|---|---|
| 61,626 A | * | 1/1867 | Matthews, Jr. ............... | 285/38 |
| 1,099,713 A | | 6/1914 | Morris | |
| 1,163,364 A | * | 12/1915 | Pedersen ...................... | 285/35 |
| 1,750,485 A | | 3/1930 | Muller, Jr. | |
| 2,449,659 A | * | 9/1948 | Lane ............................ | 285/38 |
| 2,820,651 A | | 1/1958 | Phillips | |
| 3,558,163 A | | 1/1971 | Moore et al. | |
| 4,575,130 A | * | 3/1986 | Pemberton et al. ............ | 285/38 |
| 4,615,547 A | | 10/1986 | Sutcliffe et al. | |
| 4,639,018 A | | 1/1987 | Froelich et al. | |
| 4,687,024 A | | 8/1987 | McMath | |
| 6,047,729 A | | 4/2000 | Hollister et al. | |
| 6,062,606 A | * | 5/2000 | Carpini et al. ................ | 285/38 |
| 6,321,782 B1 | | 11/2001 | Hollister | |
| 6,324,962 B1 | | 12/2001 | Majkrzak | |
| 6,532,986 B1 | * | 3/2003 | Dickey et al. ............... | 137/360 |
| 6,575,431 B2 | * | 6/2003 | Artsvelyan ................... | 251/331 |
| 6,659,373 B1 | | 12/2003 | Heren et al. | |
| 6,830,062 B2 | * | 12/2004 | Montpetit ..................... | 137/59 |

* cited by examiner

*Primary Examiner*—John Rivell
*Assistant Examiner*—John K. Fristoe, Jr.
(74) *Attorney, Agent, or Firm*—Brinks Hofer Gilson & Lione (57) ABSTRACT

A faucet adapter including an inlet assembly that includes a connecting portion configured for connection to a fluid source. A handle remote from the connecting portion is operably connected thereto such that actuation of the handle results in actuation of the connecting portion, independent of a fluid flow through the adapter.

2 Claims, 7 Drawing Sheets

REMOTE-COUPLED FAUCET ADAPTER

CROSS-REFERENCE TO RELATED APPLICATIONS

This application claims priority to U.S. Provisional Application Ser. No. 60/570,957, filed May 13, 2004.

FIELD OF INVENTION

The present invention relates generally to the field of lawn and garden accessories. Specifically, the present invention relates to embodiments of a faucet adapter.

BACKGROUND

A garden-type faucet (e.g., a spigot or sill-cock) is typically mounted on an exterior surface of a house or outbuilding. As most users acquainted with this common feature will appreciate, the faucet is often located and/or oriented in a position that makes it difficult to access or manipulate. In particular, many users may experience difficulty attaching a mounting nut of a garden accessory, such as a hose, to the threaded outlet of the faucet due in part to the close proximity of the surface on which it is mounted. For example, many users—particularly those with limited hand dexterity (e.g., a user with arthritis)—may have difficulty grasping the mounting nut of a garden hose or other accessory while attempting properly to align and mount it onto the threads of the faucet. Because of this common, awkward positioning of a typical faucet it is not uncommon for a user to scratch her knuckles against a wall on which such faucets are typically mounted, or to pinch her fingers between the mounting nut and the wall. Some faucet adapters have attempted to address this problem by including an extension for mounting onto the faucet that allows a user to attach hoses or other garden accessories onto a spigot-type structure that is distal from the faucet.

However, it may be difficult to connect and/or remove such faucet adapters to/from the faucet due at least in part to the size and/or shape of the faucet adapter body. In many cases, the user may experience difficulty gripping and twisting the mounting nut of the faucet adapter to attach it to the faucet. As with the garden hose connection problem described, this difficulty commonly occurs as a result of the confined space typically available between a faucet and the surface to which it is mounted. As also noted above, this task of connection may be particularly difficult for persons with limited hand strength and/or dexterity (e.g., elderly or infirm users).

SUMMARY OF THE INVENTION

In one aspect, the present invention includes a faucet adapter that comprises an inlet assembly configured for mounting to a faucet, and a handle remote from—but operably connected to—the inlet assembly such that actuation of the handle actuates the inlet assembly. The actuation of the remote handle actuates the inlet assembly in a manner that mounts the inlet assembly to the faucet.

In another aspect, the present invention includes a faucet adapter that comprises an inlet assembly including a mounting nut with first screw threads that are complementary to second screw threads of a faucet. The adapter also includes at least one outlet in fluid communication with the inlet assembly and a handle remote from the mounting nut. The handle operably is connected to the mounting nut by a plurality of gear surfaces such that a rotational movement of the remote handle is translated into rotation movement of the mounting nut.

In another aspect, the present invention includes a faucet adapter comprising an inlet assembly that includes a connecting portion configured for connection to a water source. The adapter also includes at least one outlet in fluid communication with the inlet assembly and a handle remote from the connecting portion that is operably connected thereto, such that actuation of the remote handle results in actuation of the connecting portion.

It is to be understood that both the foregoing general description and the following detailed description are not limiting but are intended to provide further explanation of the embodiments described. The accompanying drawings, which are incorporated in and constitute part of this specification, are included to illustrate and provide a further understanding of the presently described embodiments.

DESCRIPTION OF PRESENTLY PREFERRED EMBODIMENTS

The following description includes several presently preferred embodiments to illustrate various aspects of the invention.

Figure 2:
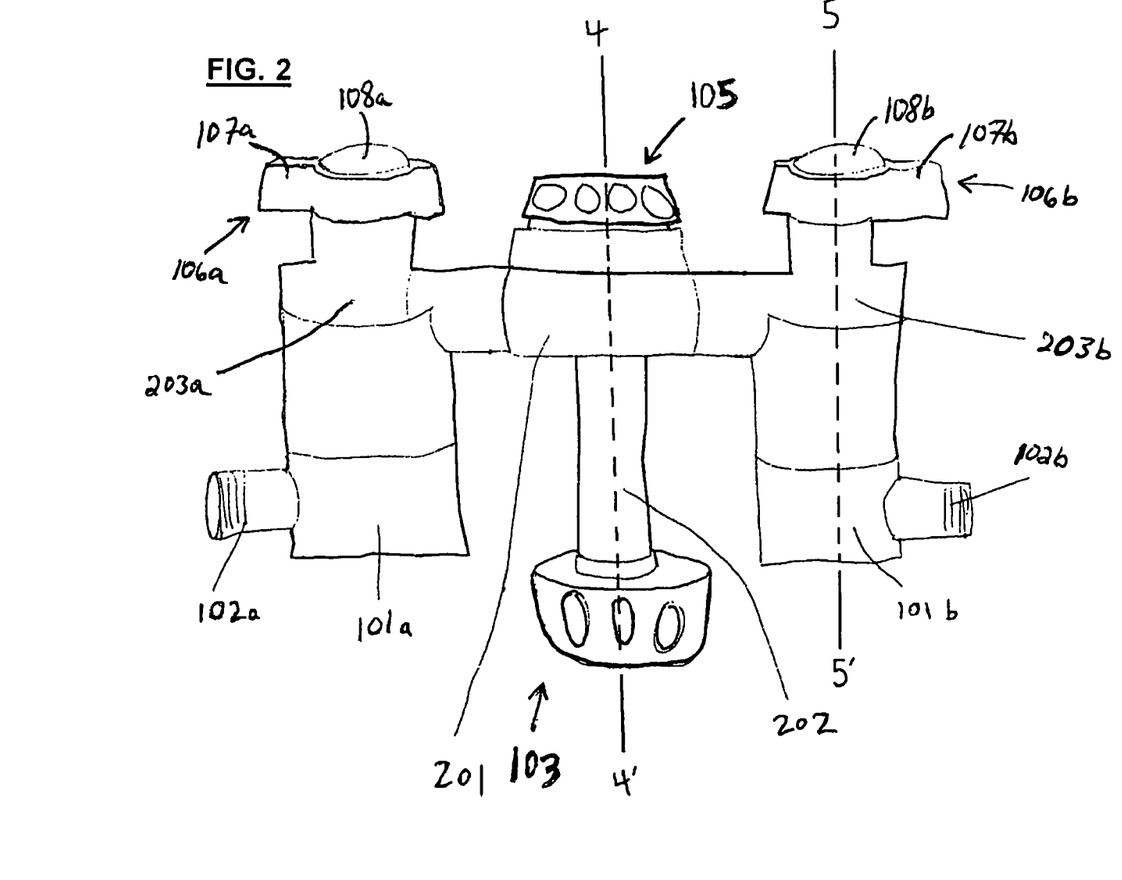
FIG. 2 is a front view of the faucet adapter of FIG. 1 with the outer casing removed.
Figure 3:
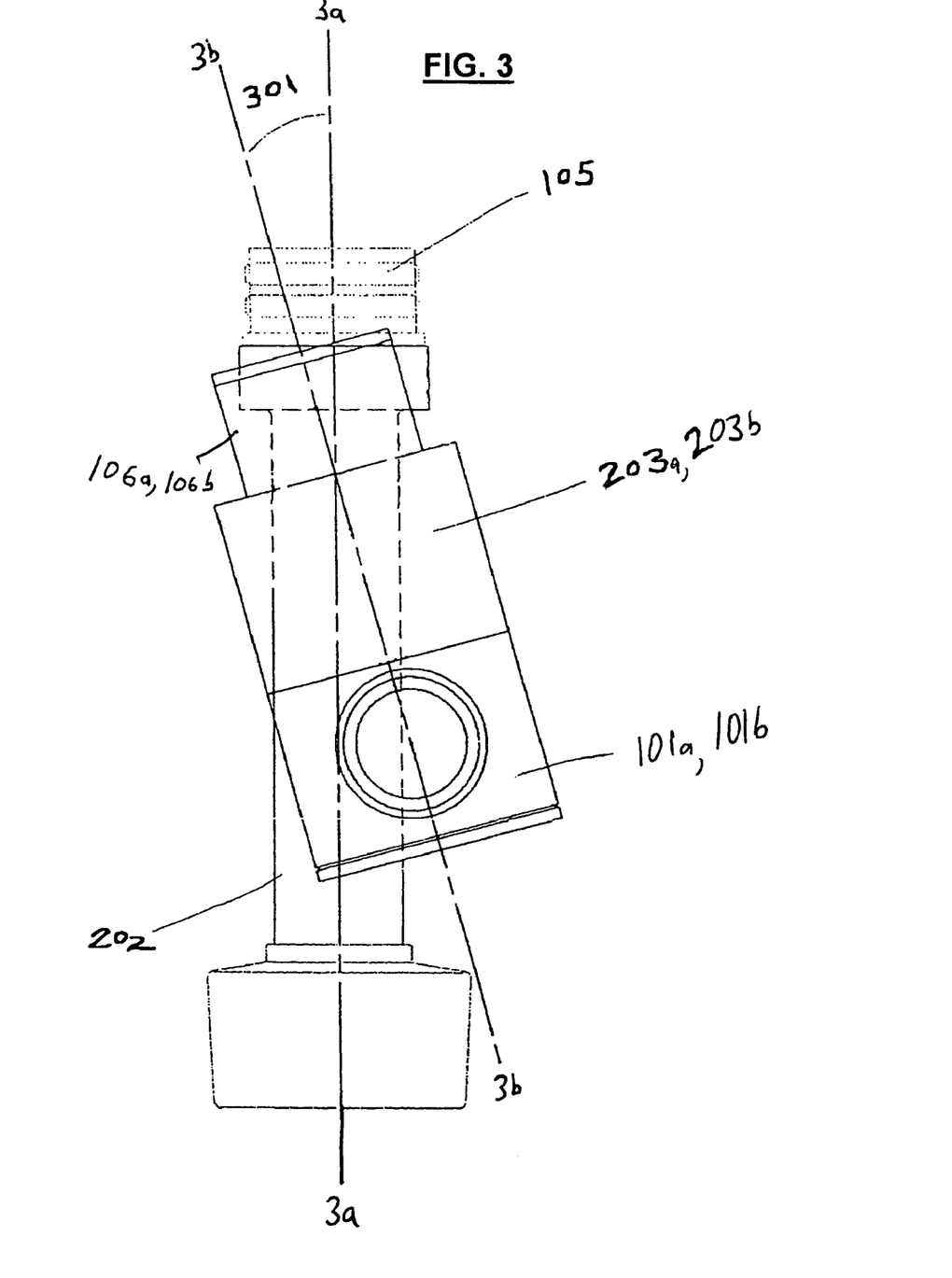
FIG. 3 is a simplified side view of the faucet adapter of FIG. 1.
Figures 4, 4A:
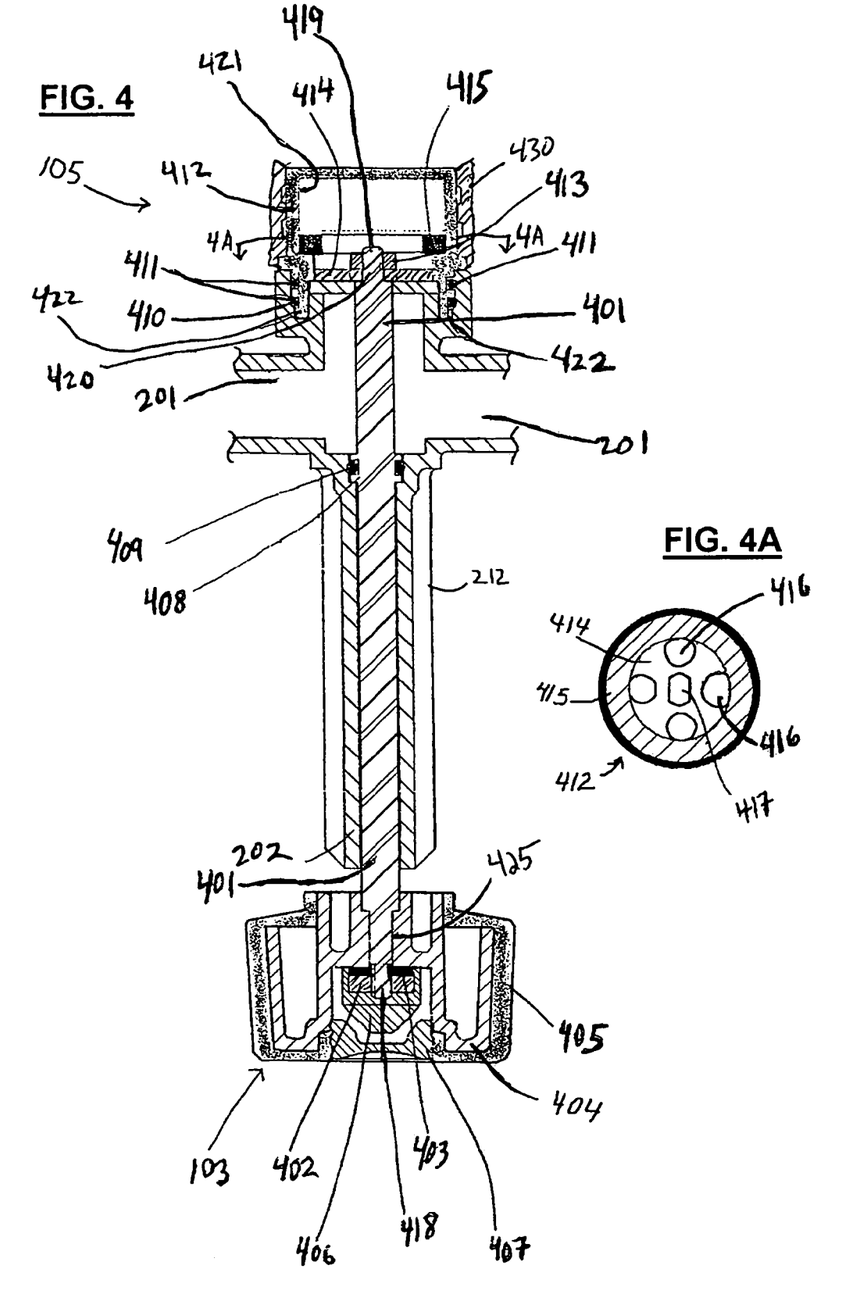
FIG. 4 is a cross-sectional front view of a central portion of the faucet adapter of FIG. 1, including a connector actuation mechanism.
FIG. 4A is a top view of a detail portion along line 4A-4A of FIG. 4.

Referring to the drawings, FIGS. 1-5 show, generally, a faucet adapter 100. The faucet adapter 100 is configured to allow a user to mount the adapter to a fluid source such as, for example, a faucet, using a handle that is remote from the connecting portion actually connecting to the faucet. The connecting portion may be, for example, a mounting nut (i.e., an internally threaded component adapted to attach to a faucet) or a quick-connect component. The faucet adapter 100 includes an inlet end assembly 105, which in turn includes an internal threaded coupling nut (not shown) for connection to the faucet. The inlet end assembly 105 is attached, through an internal connector actuation mechanism, to a remote handle 103, which preferably is shaped to provide an ergonomic or otherwise easy-to-grip surface. The remote handle 103 is positioned on the opposite end of the adapter 100 from the inlet end assembly 105. The internal components of an internal connector actuator mechanism according to one embodiment are illustrated in FIG. 4. Alternative connector actuation mechanisms within the scope of the present invention can also be used. For example, a connector actuation mechanism may be positioned in other orientations relative to the inlet end assembly 105 and/or may have components not within a flow path of water through the faucet adapter 100. Two such alternative mechanisms are illustrated in FIGS. 5A-5B.

Figure 1:
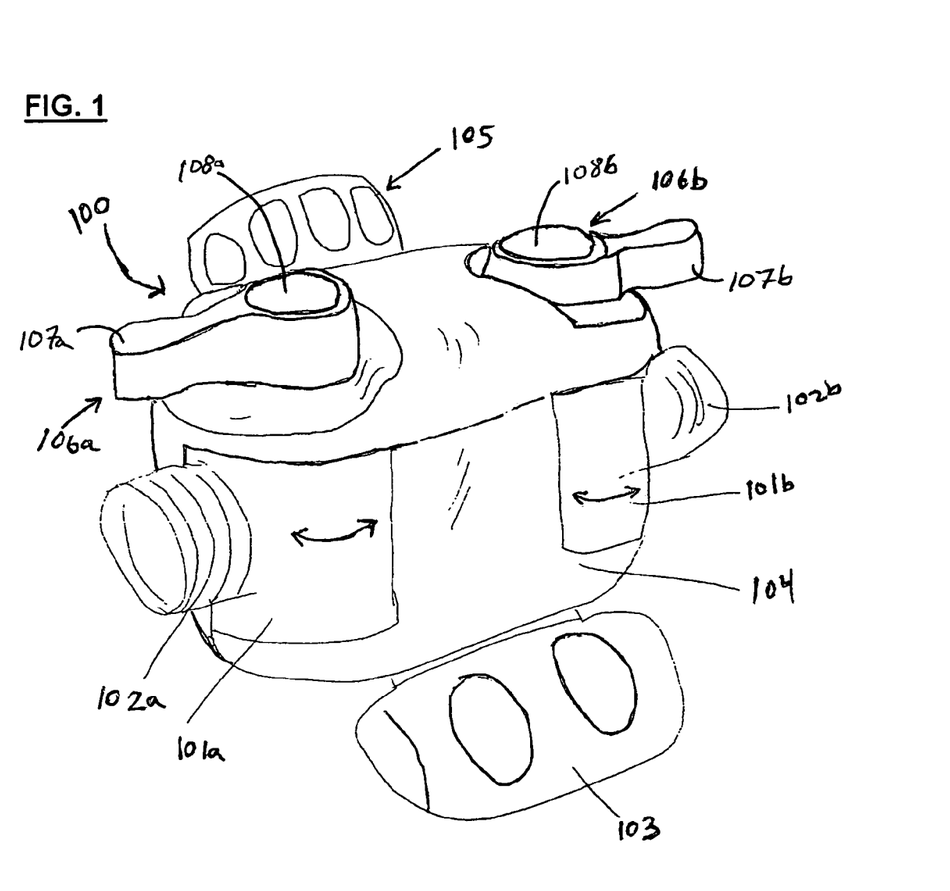
FIG. 1 is a perspective view of a faucet adapter according to one embodiment of the present invention.

The external components of the faucet adapter 100 are best seen in the perspective view of FIG. 1. An outer casing 104 encompasses the internal components of the faucet adapter 100. A pair of flow controller switches 106a, 106b is mounted on top of the faucet adapter 100. Each of the switches 106a, 106b includes a flow regulator lever 107a, 107b and a diaphragm-valve-controlling push-button 108a, 108b. The faucet adapter 100 preferably includes a pair of plastic swiveling outlet assemblies 101a, 101b that are adapted to be coupled to a garden hose or other lawn accessory with projecting threaded outlets 102a, 102b. In the illustrated embodiment, the swiveling motion of the swiveling outlet assemblies 101a, 101b is about a single axis such that the outlets 102a, 102b can move between front-pointing and side-pointing orientations. A user may directly/manually rotate the swiveling outlet assemblies 101a, 101b to reposition the threaded outlets 102a, 102b for connection to, for example, a hose. Movement of an attached hose may also rotate the swiveling outlet assemblies 101a, 101b as a result of the force on the hose. This "swivelability"/rotatability of the outlet assemblies 101a, 101b may discourage kinking of the hose and/or reduce stress on the adapter 100 and hose. In alternative embodiments, one or more swiveling outlet assemblies with a universal or ball joint or other suitable structure may be employed, thereby permitting the swiveling outlet(s) to be positioned at a greater range of angles with respect to the rest of the adapter.

The inlet end assembly 105 and remote handle 103 preferably are operably coupled such that they may be rotated in unison relative to the rest of the adapter 100. Therefore, in operation, by gripping the remote handle 103 with one hand, a user may rotate the remote handle 103 to rotate simultaneously the inlet end assembly 105 for example, to effect threaded connection to or removal from a faucet.

The adapter optionally comprises an outer casing 104, which may be made of any suitable durable and corrosion-resistant material, such as, for example, copper, brass, stainless steel or another alloy, or—preferably—a plastic. To facilitate comfortable gripping, the remote handle 103 preferably is covered with a dimpled rubber overlay or an elastomeric plastic overmold, and is shaped for easy gripping by a user. More preferably, the shape of the remote handle 103 is configured to allow ready manipulation by a user with limited dexterity (e.g., a person with arthritic hands).

FIG. 2 provides a front view of the faucet adapter 100 of FIG. 1, with the outer casing 104 removed. The following description of fluid flow through the adapter is provided with reference to FIG. 2. The general path taken by a fluid (preferably water, which is used as an exemplary fluid throughout this description) through the faucet adapter 100 enters through the inlet assembly 105 and bifurcates into a horizontal, generally cylindrical fluid passage 201. The fluid passage 201 is generally perpendicular to the inlet assembly. The water then passes from the fluid passage 201 through diaphragm valve mechanism assemblies 203a, 203b and outlet assemblies 101a, 101b, finally exiting the outlets 102a, 102b.

Typically, a faucet or other water source includes a means for controlling an on-off state and rate of water flow, such as a faucet knob. However, such faucet knobs are often in cramped quarters, or have a shape that is not easy or comfortable to grip. Thus, it is often advantageous to provide a more easily operable flow and/or on-off controller in a faucet adapter, which is done in the present embodiment. Within the faucet adapter 100, both the on-off state and the rate of water flow are regulated by independent flow controllers, which include the switches 106a, 106b that actuate the diaphragm valve mechanism assemblies 203a, 203b. The switches 106a, 106b each include a laterally rotatable flow regulator lever 107a, 107b (that can be turned to regulate flow rate) and a diaphragm-valve-controlling push-button 108a, 108b (for actuation of an internal portion of the diaphragm valve mechanism assemblies 203a, 203b that control an on-off state of water flow). The valve mechanism assemblies 203a, 203b are generally illustrated and briefly discussed with reference to FIG. 6, and preferably includes a valve and flow controller of the type disclosed in U.S. Pat. No. 6,659,373, assigned to L.R. Nelson Corp. of Peoria, Ill., which is incorporated by reference herein in its entirety.

FIG. 3 illustrates a schematic side view of the embodiment shown in FIG. 2. As shown from this side view, an axis 3a-3a is parallel to the central longitudinal axis of the inlet end assembly 105 and the remote handle 103. An axis 3b-3b is parallel the central longitudinal axis of the switches 106a, 106b, the valve assemblies 203a, 203b and the swiveling outlet assemblies 101a, 101b. Axes 3a-3a and 3b-3b are non-coplanar. From the end view perspective shown in FIG. 3, the axes 3a-3a, 3b-3b are oriented at an angle 301 relative to each other. In a preferred embodiment, the angle 301 is such that the switches 106a, 106b are tilted away from the inlet end assembly 105, allowing space to permit manual gripping of the inlet end assembly 105 if desired by the user. Any suitable angle 301 is provided, with angle 301 preferably being between about 5 and about 90 degrees. The angle 301 is more preferably between about 10 and about 20 degrees, and is most preferably about 15 degrees. An increase of the angle 301 can provide increased space between the adapter 100 and the mounting surface of the faucet or sill cock, for example to allow easy operation of the swivel outlet assemblies 101a, 101b, the rotatable levers 107a, 107b, and the remote handle 103.

FIG. 4A shows a front-view cross-section along line 4-4' of the central portion of the faucet adapter 100 of FIG. 2. The internal body structure of the adapter 100 includes a rod housing 202 including an internal bore that houses the turning rod 401. The turning rod 401 is connected to the remote handle 103 at one end and to the inlet end assembly 105 at the other end. The turning rod 401 extends through and rotates freely within the rod housing 202, including the open internal portion where the housing intersects the fluid passage 201. Thus, in this embodiment, the remote handle 103 and the inlet end assembly 105 are operably connected by the turning rod 401 to rotate together with respect to the rest of the adapter 100. Consequently, when a user rotates the remote handle 103, the motion is translated into rotation of the inlet end assembly 105 such that it can threadingly connect to a faucet. The operable connection responsible for this rotation preferably occurs independently of any fluid flow regulation function of the faucet adapter 100.

The turning rod 401 preferably is formed from any material that is sufficiently durable to translate rotational movement from the handle 103 to the inlet end assembly 105. Preferred materials are those that will not corrode in the presence of a fluid passing through the fluid passage 201. Suitable materials include stainless steel and brass, the latter of which is preferred.

Referring again to FIG. 4, the inlet end assembly 105 comprises a brass coupling nut 412 surrounded by an optional plastic overmold 430. The coupling nut 412 is generally cylindrical in shape and includes an open top end, inside walls having a threaded surface 421 configured for attachment to complementary threads of, for example, a faucet.

The inlet end assembly 105 also includes a bottom plate 414. The bottom plate 414 is more clearly shown in FIG. 4A, which presents a top view detail from along line 4A-4A. The bottom plate 414 includes a generally rectangular central opening 417, which is surrounded by a plurality of generally circular apertures 416 that provide a path for water flow from the faucet to the fluid passage 201. A hose washer 415 is located within the generally cylindrical body of the coupling nut 412, and is seated adjacent the bottom plate 414. A generally cylindrical lip 422 with o-ring-mounting circumferential grooves 411 extends below the bottom plate 414. The generally cylindrical lip 422 fits into and rotates within a generally circular groove 410 at the top end of the rod housing 202.

Referring again to FIG. 4, first end of the turning rod 401 extends a short distance through the center rectangular opening 417 of the coupling nut 412. The first end of the rod 401 includes a threaded end segment 419 for attachment to a nut 413. Adjacent the threaded end segment 419, the turning rod 401 has a short segment with a rectangular cross-section 420 that fits snugly inside the rectangular opening 417 of the bottom plate 414. The turning rod 401 is coupled to the coupling nut 412 by placing the rectangular segment 420 in the rectangular opening 417 and threading the nut 413 onto the threaded segment 419 of the rod 401 above the bottom plate 414 of the coupling nut 412. This configuration is adapted such that the coupling nut 412 will rotate when the turning rod 401 is turned by rotation of the handle 103. Of course, the turning rod 401 may, in alternative embodiments, be connected to the handle 103 and/or the coupling nut 412 by any suitable connection method/structure.

The rod housing 202 extends above and below a wall defining the fluid passage 201 at approximately right angles, near the inlet end assembly 105. The upper portion of the rod housing 202 is open internally to allow water flow therethrough, from the inlet assembly 105, bifurcating out into both sides of the fluid passage 201 and on toward the valve assemblies 203a, 203b. Preferably, the rod housing 202 includes longitudinal fin projections 212 to increase its structural strength. The turning rod 401 extends through the length of the rod housing 202, and crosses through approximately the center of the fluid passage 201. Adjacent the region where it crosses the fluid passage 201, the turning rod 401 includes a short segment 408 with a larger diameter than is present through the rest of its length. A corresponding segment of the rod housing 202 has a larger diameter than is present through the rest of its length. A circumferential groove is provided around the larger-diameter rod segment 408, with a rubber o-ring 409 in it to help prevent leakage of water from the fluid passage 201 into the rod housing 202. Below the larger-diameter short segment 408, the turning rod 401 extends through the rod housing 202 to an attachment with the remote handle 103. In alternative embodiments, the rod housing can be positioned in a number of different orientations with respect to the fluid passage, provided that the operable connection between the handle and inlet assembly is maintained.

The handle body 404 of the remote handle 103 includes a central channel 425 through which a bottom portion of the turning rod 401 extends. Preferably, the central channel 425 is operably attached around a portion of the turning rod 401. In a preferred embodiment, the central channel 425 and the corresponding portion of the turning rod 401 include complementary, generally rectangular cross-sections that engage such that the turning rod 401 will rotate when a user rotates the handle 103. The turning rod may alternatively be secured to the handle 103 by an adhesive, weld, cross-pin arrangement, or other securing structure. The bottom end of the turning rod 401 includes a threaded segment 418 for attachment to a nut 402, which secures the turning rod 401 to the remote handle 103. A plastic nut cover 406 preferably is fitted over the nut 402. Preferably, a washer 403 is placed over the threaded segment 418 of the rod 401 between the nut 402 and the handle body 404. A rubber knob overmold 405 preferably is placed over the knob core 404, and most preferably includes dimples or another contoured surface shape configured for easy gripping. The portion of the handle body 404 containing the washer 403, nut 402 and nut cover 406 preferably is capped with a rubber retaining cap 407.

Figures 5A, 5B:
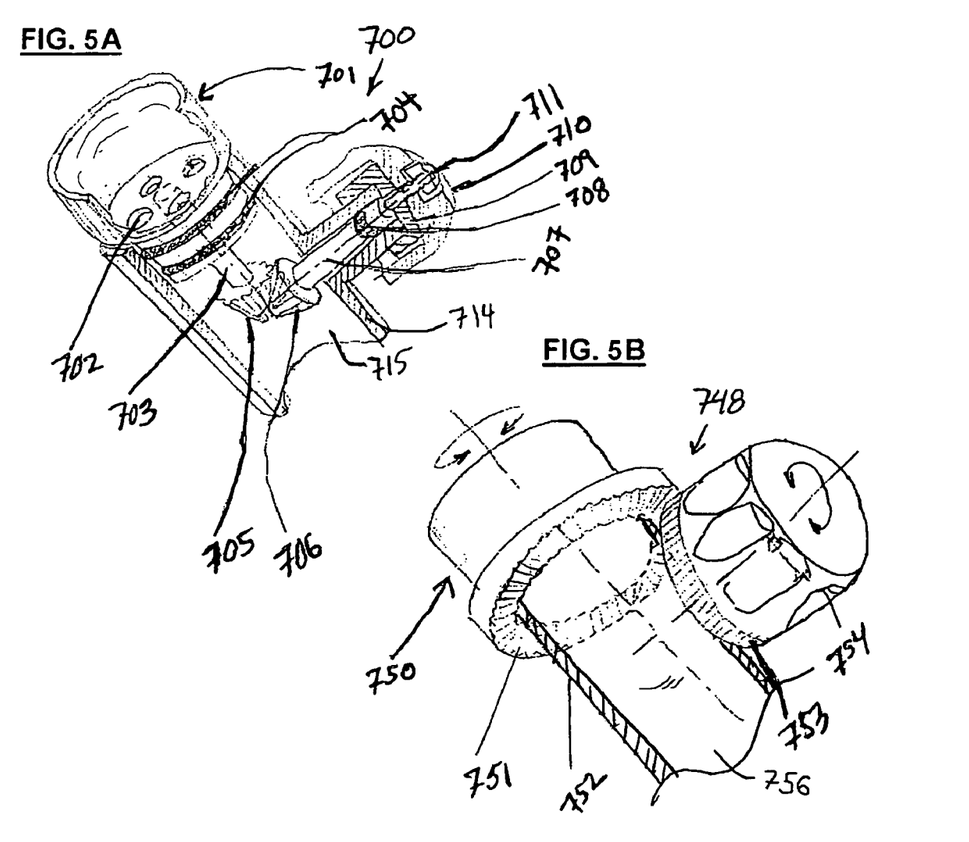
FIG. 5A shows an alternative embodiment of a remote connector actuation mechanism of the present invention.
FIG. 5B shows another alternative embodiment of a remote connector actuation mechanism of the present invention.

FIGS. 5A and 5B show how, in alternative embodiments of a faucet adapter, the connector actuation mechanism component embodied in FIGS. 1-5 as the turning rod 401 may be replaced with a gear mechanism. Specifically, the embodiments of FIGS. 5A-5B also allow a user to connect an adapter to a faucet by actuating a handle (remote from the faucet-connecting portion of the adapter) that, in turn, actuates a connector in an inlet end assembly. A partially cutaway perspective view of a first gear mechanism embodiment is illustrated as a beveled gear mechanism assembly 700 and depicted in FIG. 5A. The beveled gear mechanism assembly 700 includes an inlet end assembly 701 operably connected to a remote coupling knob 710. The inlet end assembly 701 includes holes 702 to allow a flow of water therethrough into a water passage 715 defined by a housing 714. The inlet end assembly 701 preferably is configured for mounting to a faucet with complementary threads or other connective structure. Rubber seals 704 are placed around the inlet end assembly 701 to help prevent leakage. The inlet end assembly 701 is mounted to a first rod 703 that terminates in a first beveled gear 705 distal to the inlet end assembly 701. The toothed surface of the first beveled gear 705 is configured to engage with the toothed surface of a second beveled gear 706. The second beveled gear 706 is mounted to a distal end of a second rod 707 that is mounted generally perpendicular to the first rod 703, and which extends through a side of the water passage 715.

To provide a remote connection function, the proximal end of the second rod 707 is attached to the remote coupling knob 710 by a nut 711 that is screwed onto the end of the second rod 707. A retainer cap 709 holds the internal components of the handle assembly in place within a side projection of the housing 714, while an o-ring seal 708 around the second rod 707 is placed to help prevent leakage. The beveled gear mechanism assembly 700 provides an operative connection such that when a user turns the remote coupling knob 710, the second beveled gear 706 rotates the first beveled gear 705, thereby rotating the inlet end 701 (relative to the water passage housing 715) for connecting/disconnecting it to/from a faucet or other complementary mounting surface such as a garden hose.

FIG. 5B shows a second gear mechanism embodiment 748 wherein a rotatable inlet end assembly 750 is operably connected to a remote coupling knob 754. The rotatable inlet end assembly 750 includes a first gear surface 751 and is disposed on a non-rotatable generally cylindrical body wall 752, which defines a water passage 756. The inlet end assembly 750 preferably is configured (e.g., with threads, a quick-connect structure, or other connective structure) for mounting to a faucet. The remote coupling knob 754 is mounted on the generally cylindrical wall 752 substantially perpendicular to the inlet end assembly 750 such that a second gear surface 753 on the knob 754 engages the first gear surface 751, thereby translating rotational movement of the remote coupling knob 754 into rotational movement of the inlet end 750. In a preferred embodiment, this configuration may reduce the number of components inside the water passage 756 and may thereby improve a flow of water therethrough. In addition to the connector actuation mechanisms shown in FIGS. 4, 5A, and 5B, various other connector actuation mechanisms may be used to operably connect the inlet end of the adapter to a remote coupling knob or other handle configuration within the scope of the present invention.

Figure 6:
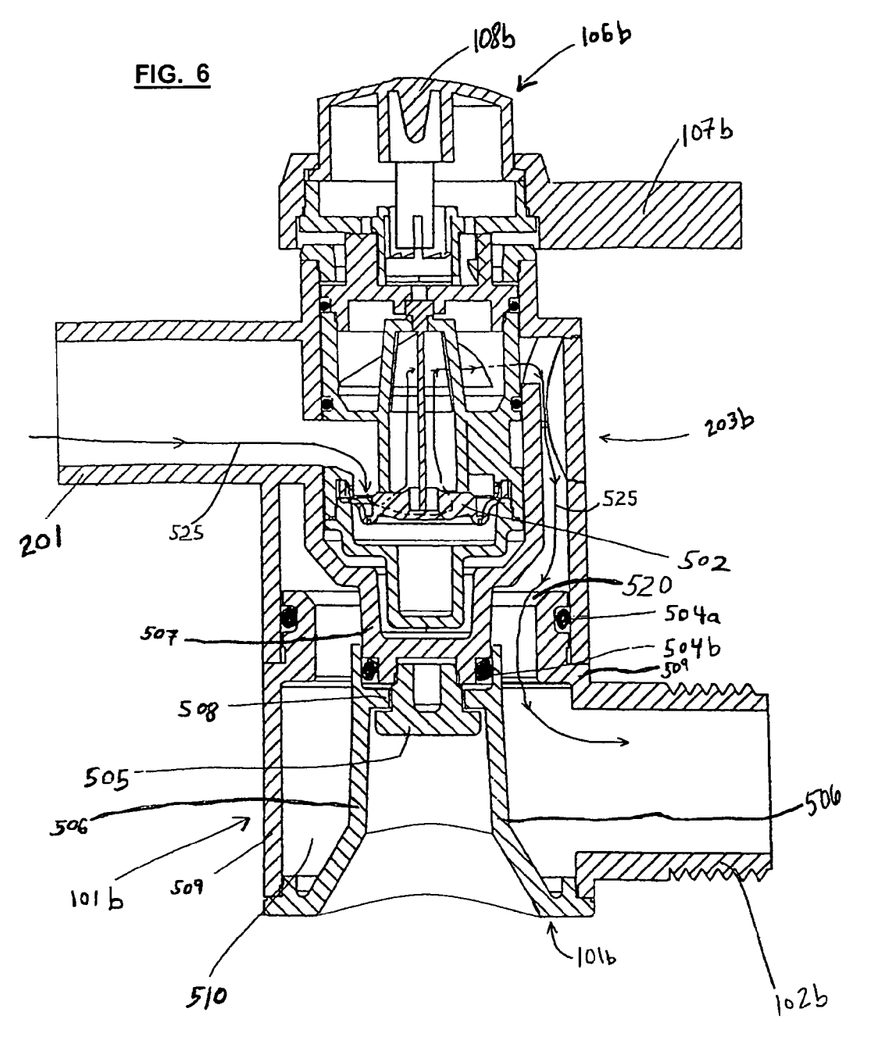
FIG. 6 is a cross-sectional front view of a side portion of the faucet adapter of FIG. 1.

A right-side portion (along line 5-5' of the adapter 100 of FIG. 2) is shown in a front-view cross-section in FIG. 6. This view generally includes an end portion of the fluid passage 201, valve assembly 203b, and swiveling outlet structure 101b. Water flow from the fluid passage 201 to the swiveling outlet 101b preferably is regulated by a diaphragm-type valve assembly 203b, which is actuated by switch 106b. The structure and function of a preferred switch/valve assembly are described in greater detail in U.S. Pat. No. 6,659,373, entitled "One Touch Actuated Valve" and assigned to L.R. Nelson Corporation, incorporated herein by reference. Generally, in operation, the valve is actuated by pushing the button 108b, which—using a mechanism similar to that found in a typical push-button ballpoint pen—actuates the diaphragm 502 into an opened or closed position as described in the aforementioned patent. (In FIG. 6, the diaphragm 502 is shown in a closed position; a path of water flow is indicated by arrows 525). The flow rate of the water flow is regulated by turning a lever 107b, which rotates an upper portion of the valve assembly 203b to adjust the size of an open flow path between the fluid passage 201 and the swiveling output 101b. This, in turn, regulates the flow of water to the swiveling output 101b and therethrough to a hose attached to the threaded outlet adapter 102b. Those skilled in the art will appreciate that other types of flow control means and/or valves may be employed without departing from the scope of present invention.

The swiveling output assembly 101b includes a generally inverted-cup-shaped body that includes an outer wall 509 and an interior wall 506. A portion of the outer wall 509 includes a threaded projection that forms the outlet 102b. The space between these walls 506, 509 receives the water that flows into the swiveling output 101b through an aperture 520 from the valve assembly 203b. The interior wall 506 includes an angled base portion and extends, at its broadest diameter, from the bottom of the outer wall 509 up to an internal support 507 at the base of the valve assembly 203b. The top portion of the interior wall 506 includes an inward extending lip 508. The swiveling output 101b is held rotatably in place by a plug 505 that is affixed (e.g., welded, glued, or screwed) to the internal support 507. The inward extending lip 508 is held slidingly/rotatingly between the plug 505 and the internal support 507. This configuration generally prevents vertical or horizontal movement of the swiveling output 101b relative to the internal support 507. However, the swiveling output 101b is able to rotate around the plug 505, thereby permitting the swiveling motion of the swiveling output 101b (relative to the valve assembly 203b, and the rest of the adapter 100). O-rings 504a and 504b are placed between the outer and inner walls 509, 506 of the swiveling output 101b and adjacent surfaces to help prevent water leakage.

Figures 7A, 7B, 7C, 7D, 7E, 7F:
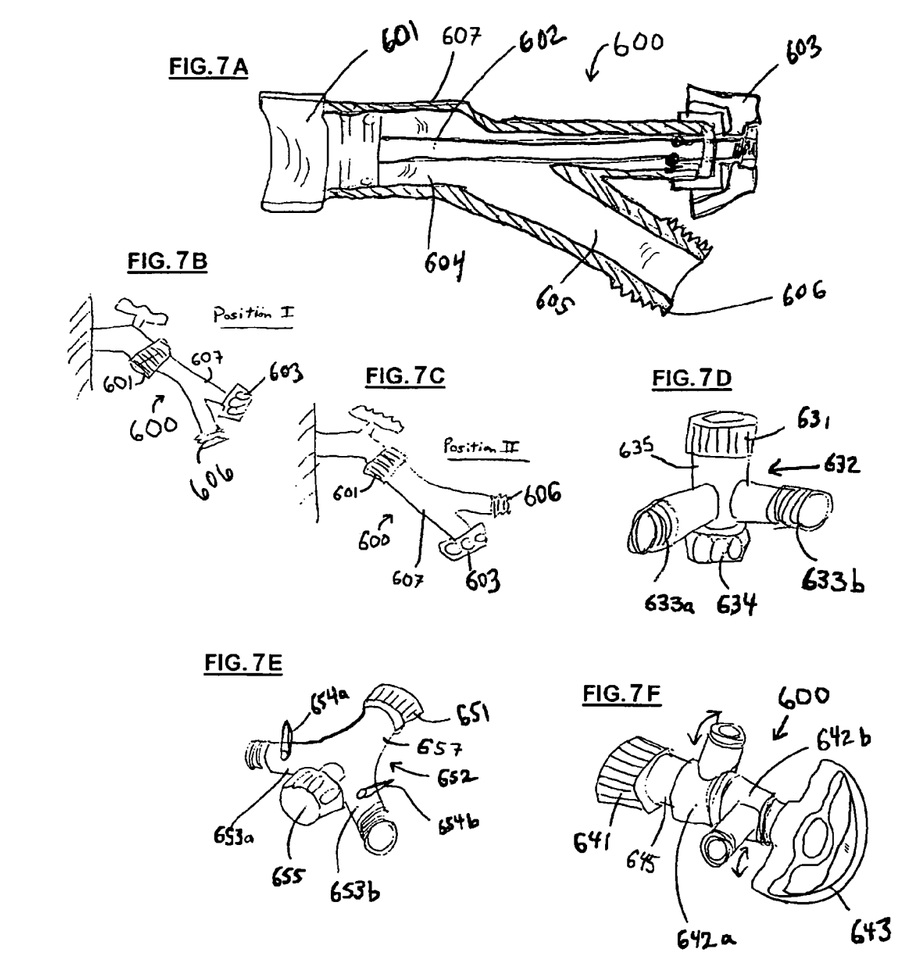
FIGS. 7A-7C depict another embodiment of the present invention.
FIG. 7D depicts another embodiment of the present invention.
FIG. 7E depicts another embodiment of the present invention.
FIG. 7F depicts another embodiment of the present invention.

FIGS. 7A-7E show views of alternative embodiments of faucet adapters. Each embodiment has a handle remote from an inlet end assembly (that includes an attachment structure such as a mounting nut). In each of the embodiments, a mechanism between the remote handle and the inlet assembly provides for remotely actuating the inlet end assembly to attach it to a faucet. FIG. 7A shows a longitudinal cross-section of one adapter embodiment 600, which includes a mounting nut-containing inlet end 601 operably coupled to a remote coupling knob 603 by a turning rod 602. The rod 602 passes through the body 607 of the adapter 600, which has an internal water passage 604 that branches off at an angle to an outlet passage 605. The threaded outlet end 606 preferably is adapted for connection to a garden hose or other garden implement. FIGS. 7B-7C illustrate that the adapter 600 may be connected to the faucet in a variety of positions. For example, in FIG. 7B, the adapter 600 is oriented in Position I, with the remote coupling knob 603 positioned above the outlet end 606, and in FIG. 7C it is oriented in Position II, with the remote coupling knob 603 positioned below the outlet end 606. These, or other positions, may present a particular advantage for a user depending upon, for example, the space available around the faucet and/or the user's dexterity.

FIG. 7D shows another adapter embodiment 632, which includes a mounting nut-containing inlet end 631 operably coupled to a remote coupling knob 634. As an alternative to a traditional mounting nut structure, this and other adapter embodiments may include a remotely actuatable "quick connect" structure for connecting to a faucet. In the illustrated embodiment, the body 635 of the adapter 632 has two threaded outlet ends 633a, 633b extending generally perpendicularly from each other and from the body 635.

FIG. 7E shows yet another adapter embodiment 652, which includes an inlet end 651 operably coupled to a remote coupling knob 655. The body 657 of the adapter 652 provides a path of fluid communication between the inlet end 651 and two outlet tubes 653a, 653b having threaded ends adapted for connection to a garden hose. Water flow to each of the outlet tubes 653a, 653b preferably is regulated by levers 654a, 654b which each actuate an internal flow control mechanism in one of the outlet tubes. Those of skill in the art will appreciate that a variety of such mechanisms are known and available for use within the scope of the present application.

FIG. 7F shows still yet another adapter embodiment 640, which includes a mounting/inlet end 641 operably coupled to a remote handle 643. The remote handle 643 includes an alternative ergonomic shape and an easily grippable overlay, preferably of rubber or plastic, that may be used with other embodiments. The body 645 of the adapter 640 includes two swiveling outlets 642a, 642b that are mounted in series and can be swiveled independently of each other. Preferably, the outlets 642a, 642b each have threaded ends adapted for connection to a garden hose.

It will be apparent to those skilled in the art that various modifications and variations can be made to the apparatus of the present invention without departing from the spirit or scope of the invention. It is therefore intended that the foregoing detailed description be regarded as illustrative rather than limiting, and that it be understood that it is the following claims, including all equivalents, that are intended to define the spirit and scope of this invention.

We claim:

1. A faucet adapter, comprising:
    an inlet assembly including a connecting portion configured for connection to a faucet;
    at least one outlet;
    a fluid passage extending between the inlet assembly and the at least one outlet, and providing fluid communication therebetween; and
    a handle remote from the connecting portion and operably connected thereto by a rod;
    said rod including a first rod end attached to the handle and a second rod end attached to the connecting portion;

said rod extending through at least a portion of the fluid passage and providing the operable connection between the handle and the connecting portion;

wherein the operable connection is configured such that actuation of the handle results in an actuation of the connecting portion, said actuation being configured for connecting the connecting portion to a water spigot;

wherein the fluid is water and the faucet adapter further comprises a push-button-actuated valve, at least a portion of which is within the fluid passage, and the push-button-actuated valve is configured to provide on-off control of water flow from the inlet assembly to the at least one outlet.

2. The faucet adapter of claim 1, wherein the valve is a diaphragm valve.

* * * * *